United States Patent [19]
Slocum

[11] Patent Number: 5,964,242
[45] Date of Patent: Oct. 12, 1999

[54] METHOD OF AND APPARATUS FOR SUBSTANCE PROCESSING WITH SMALL OPENING GATES ACTUATED AND CONTROLLED BY LARGE DISPLACEMENT MEMBERS HAVING FINE SURFACE FINISHING

[75] Inventor: Alexander H. Slocum, Bow, N.H.

[73] Assignee: AESOP, Inc., Concord, N.H.

[21] Appl. No.: 09/012,630

[22] Filed: Jan. 23, 1998

[51] Int. Cl.[6] .................................................. F16K 11/10
[52] U.S. Cl. .............................. 137/240; 137/870; 251/11
[58] Field of Search .............................. 137/240; 251/11, 251/298, 870

[56] References Cited

U.S. PATENT DOCUMENTS

| | | | |
|---|---|---|---|
| 3,426,800 | 2/1969 | Bauer | 137/870 |
| 4,340,083 | 7/1982 | Cummins | 251/11 X |
| 4,535,810 | 8/1985 | Duder et al. | 137/870 X |
| 4,585,209 | 4/1986 | Aine et al. | 251/129.02 |
| 5,325,880 | 7/1994 | Johnson et al. | 251/11 X |
| 5,445,185 | 8/1995 | Watanabe et al. | 137/870 X |
| 5,619,177 | 4/1997 | Johnson et al. | 251/129.01 X |

*Primary Examiner*—John Fox
*Assistant Examiner*—John Bastianelli
*Attorney, Agent, or Firm*—Rines and Rines

[57] ABSTRACT

A mechanism to control the size of particles flowing through it, even to the nanometer scale, that contains a beam or plate effectively anchored at the bottom of each of a plurality of adjacent chambers, and, wherein the top of the beam or plate and the bottom of the chambers are polished to a degree finer than the particle size to be excluded, and with the polished surfaces normally brought into intimate contact to close off the chambers; an extension to the beam or plate acting as a force source to the beam or plate, such that when the extension is deflected a known large amount, the resulting deflection in the neighborhood of the anchoring point is very small, enabling the extension to create a transmission effect with the bending of the extension down, making the beam or plate act like a cantilever and opening the system for flushing; while bending the beam up, puts the beam in three point bending, and guides the substances from one chamber to another, with appropriate exit seal.

28 Claims, 9 Drawing Sheets

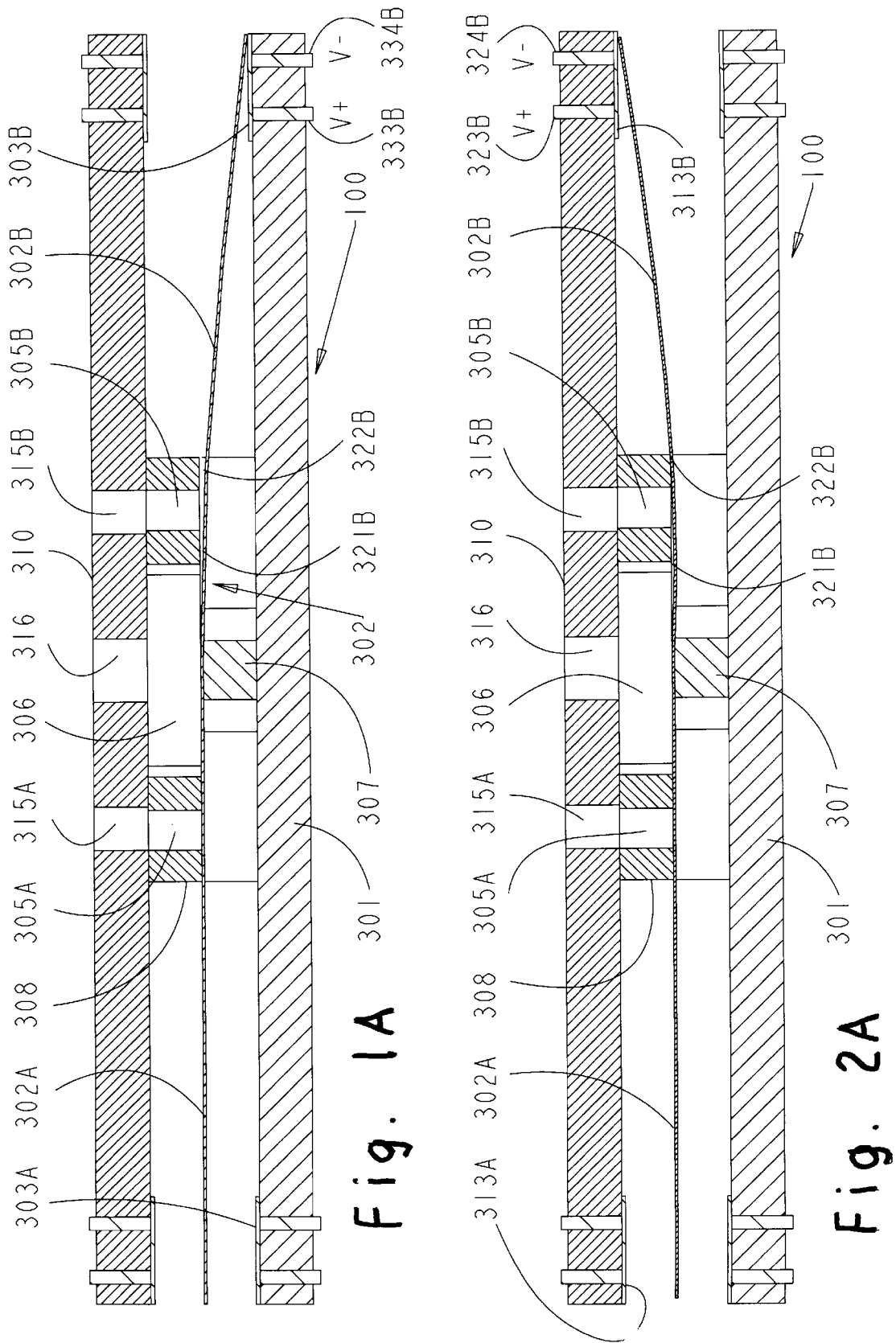

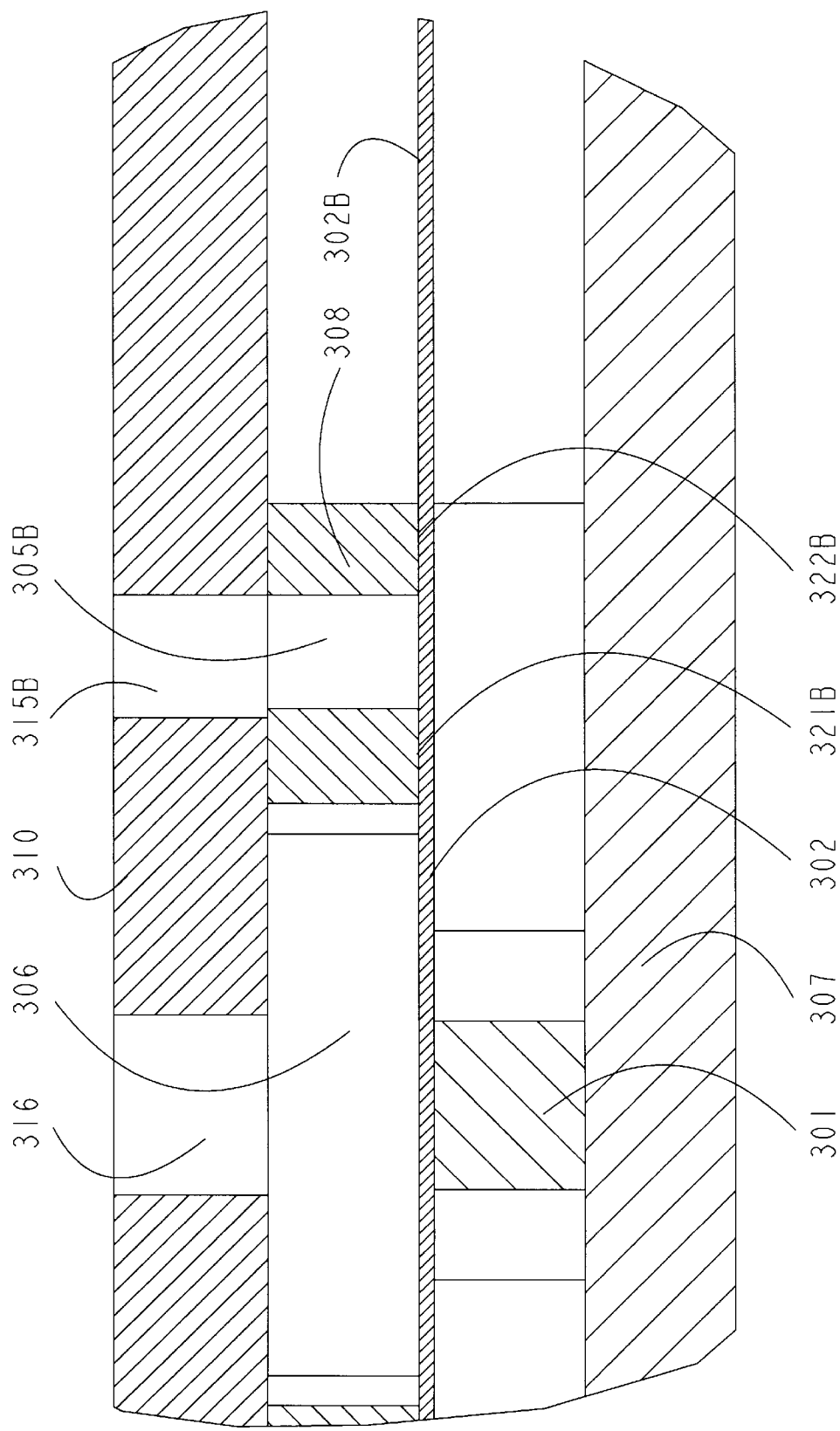

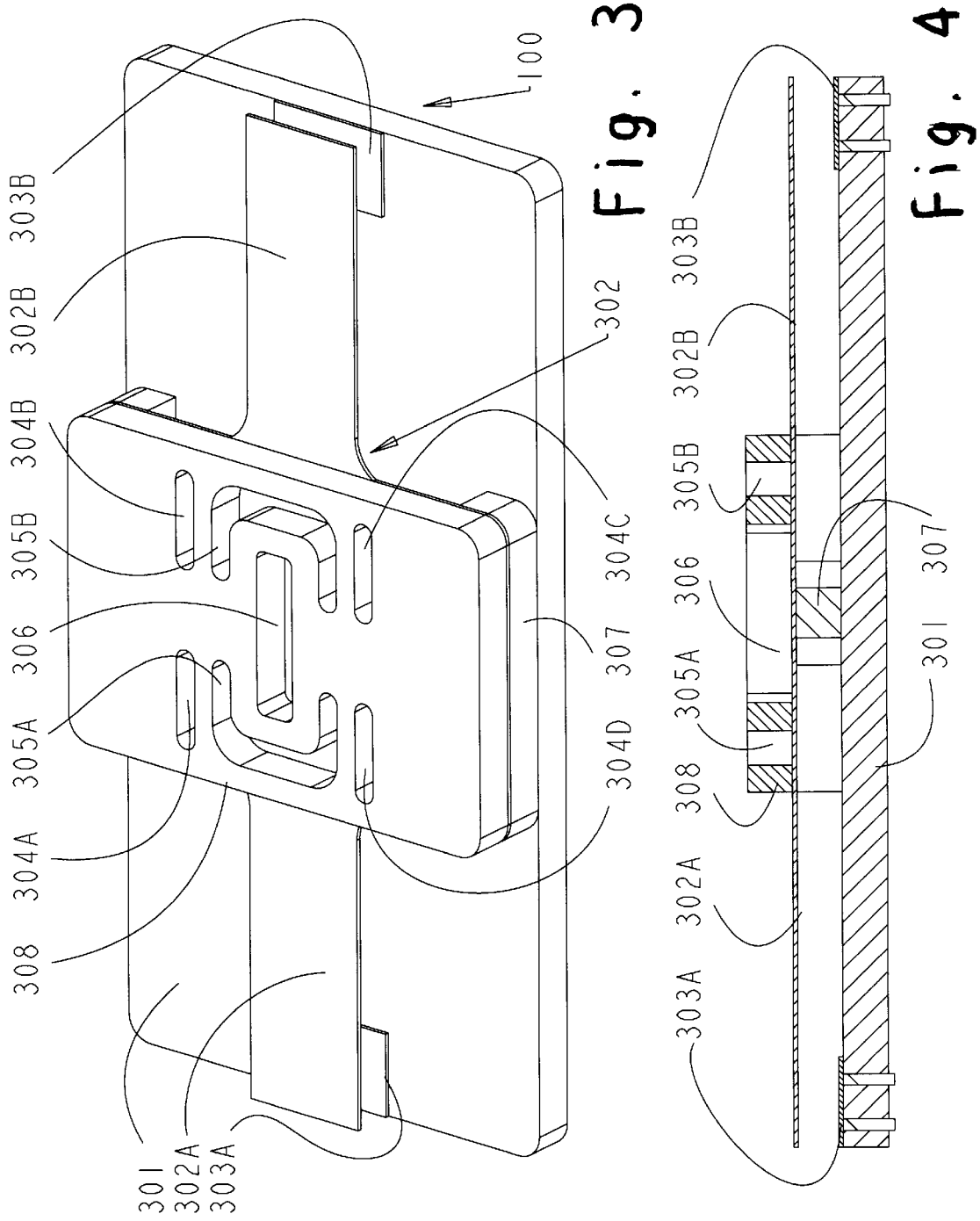

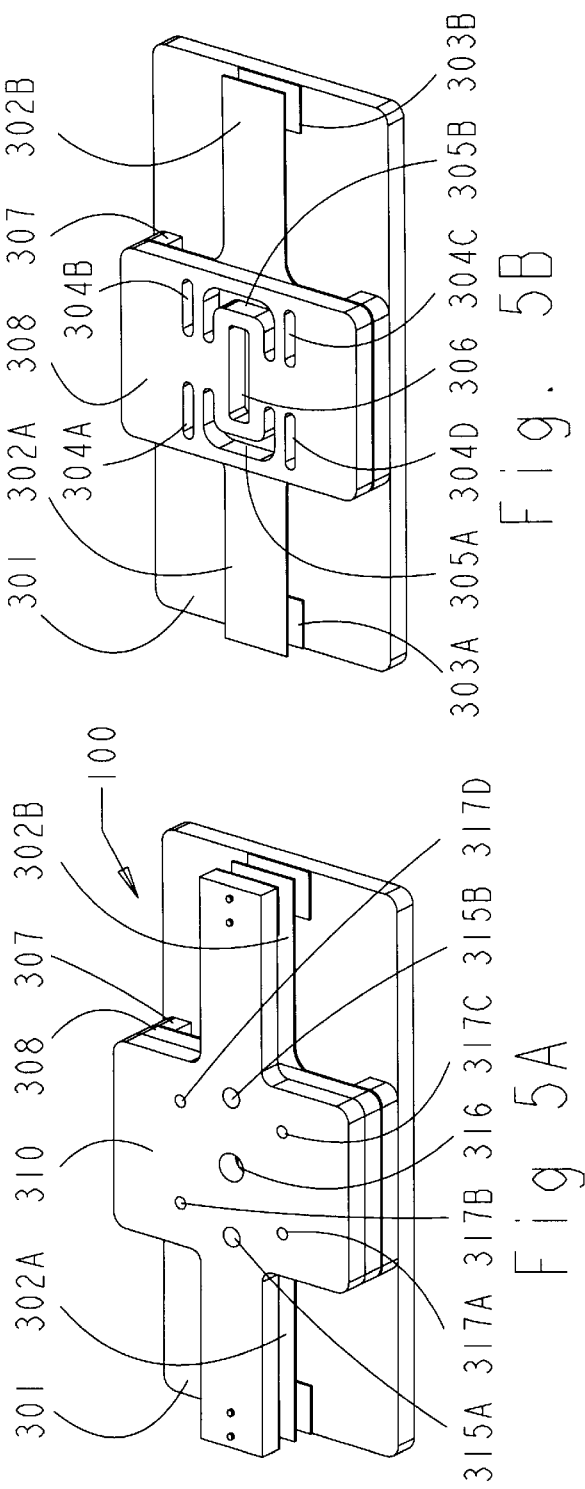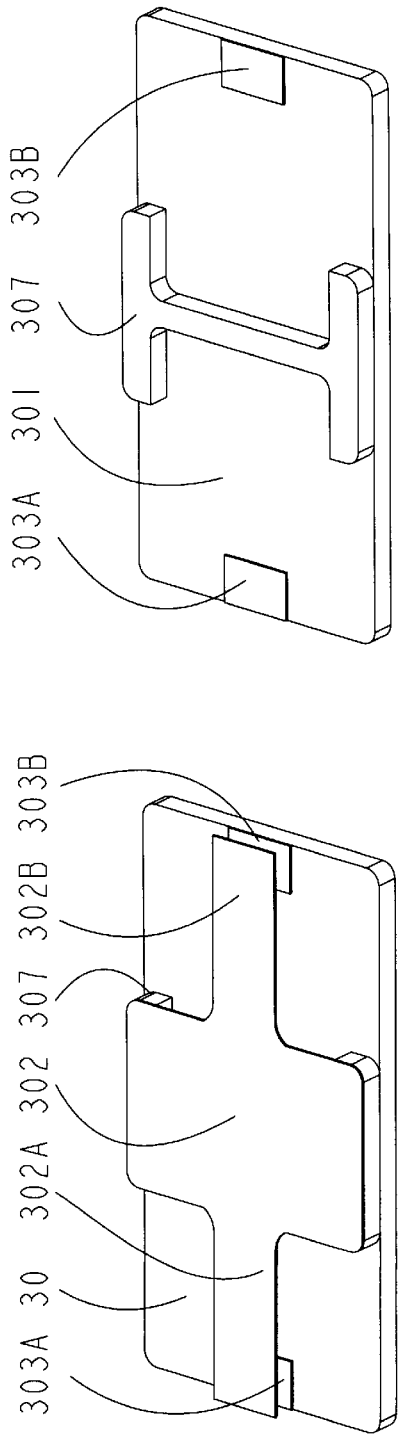

METHOD OF AND APPARATUS FOR SUBSTANCE PROCESSING WITH SMALL OPENING GATES ACTUATED AND CONTROLLED BY LARGE DISPLACEMENT MEMBERS HAVING FINE SURFACE FINISHING

The present invention relates to systems and techniques for handling substances or materials such as fluids, gases, including particles and molecules in fluids or gases, or flowable particles more generally, where the material is to be assembled or processed in one chamber, for example, and then selectively moved to other chambers, often with filtering action to control particle size flow between the chambers. Applications of the invention include from macro-scale particle or object separation down to nano-scale filtering of individual molecules such as are processed in the biotechnology and pharmaceutical industries, and more extremely fine level of control filtering as for ultra-purification of substances.

BACKGROUND

Turning first to the chemical and microbiological fields, biologists and chemists have long sought techniques for separating substances, molecule by molecule, as for determination of which type of molecule(s) remain after various test reactions. This is not easily possible on a bulk scale, because some leakage and contamination between species is inevitable. Molecular dimensions are also on the order of nanometers; so, despite the popular image of Micro Electro Mechanical systems (MEMs), "tweezers" are not available to operate on a "large mixed bucket of molecules".

There are currently no known methods for creating a molecular level slit to act as a precise gate or door, let alone a controllable gate, that only permits desired size molecules to pass through; the only methods available being conventional filter technology, where large amounts of molecules must be presented to interleaved elements (i.e., many layers of extremely fine filter cloth). Unfortunately, this filtering bulk process requires the use and loss of a large quantity of the sample to be processed and, at that, conventional filters enable only one molecule to be sorted, and with large amounts of material lost in the filter. When dealing with biological samples, such as DNA, samples tend to have very expensive values, sometimes approaching $750,000/gram.

As a macro analogy, consider the boiling of potatoes, in a pot, and when they are ready, using the cover on the pot to hold back the potatoes while the cooking water is poured out of a slot or crack, between the tilted pot rim and the cover. Sometimes it is poured down the sink, but other times it is collected as for making bread. The key is to hold the cover so it opens only a crack, so the cooking water can pour out, but the potato pieces stay in the pot. So must it be with a mechanism that is to be used to sort molecules in accordance with the invention.

Given the functional requirement to be able to form a mechanical gate to control the size of a substance that can pass through to the nanometer level, and the background design parameters that no MEMs feature can be reliably formed less than 100 nanometers in size, it at first blush may appear that there is no solution along this direction. In accordance with the present invention, however, through the novel use of deflection beam or plate gating design parameters with a surface that can easily be polished to the 1 nanometer level, an entirely new class of controllable gate mechanisms has been achieved—so-called Ultra Surface Finish Effect Mechanisms (USFEMs).

Upon larger scales, the invention provides similar features of novel precision gating for particle separation and the like, as later more fully discussed.

OBJECT OF THE INVENTION

A primary object of this invention is to provide a new and improved method of and apparatus for filtering objects, particles, and even molecules, including in fluid and other materials flowable between chambers, and that utilizes novel ultra-surface finished beam or plate-controlled mechanical precision gating to precisely limit the size of objects that can pass through the gate opening.

A further object is to provide such a gate device that opens to allow substances to be flushed through to drain, and at the next instant creates an opening to control the flow between chambers, particularly, though not exclusively, for biological, molecular and chemical applications.

Another object is to provide such a device that will inherently not be prone to sticking, because the opening method mimics a peeling effect.

Still a further object of the invention is to create a novel fundamental nano gating element that can be combined in series or parallel, much like electronic gate transistors are combined for forming integrated circuits, to create a device with a series of controlled fluid logic steps, thereby allowing for the micro-miniaturization of a host of substance analysis instruments that include, for example, mass spectrometers, and related devices.

Other and additional objects will be explained hereafter and they are more fully delineated in the appended claims.

SUMMARY

In summary, the invention embraces, a method of mechanically gating the flow of particle-containing fluid substances and the like contained in one or more adjacent hollow chambers, that comprises, polishing the top surface of a resilient plate that is to extend over and close off the bottom edges of the hollow chambers and also correspondingly polishing the chamber bottom edges to a degree finer that the size of the particles to be excluded during the fluid substance gating from the chambers; anchoring the plate to extend over and normally close off the bottoms of the chambers during contact with the top surface of the plate; extending the plate at least from one end to provide a deflection force surface therefor, applying selectively downwardly and upwardly directed deflection actuating forces to the plate extension surface to deflect the extension an amount large compared to the resulting deflection of the plate in the neighborhood of its anchorage, thereby to create a transmission effect along the plate; the plate, when deflected, downwardly, bending down like a cantilevered beam to open a controlled gap between a bottom edge of a chamber and the top surface of the plate to permit the gated flushing of particles of desired size range in the fluid substance out of that chamber; and the plate, when deflected upwardly, bending up to establish multiple point contacts that provide a controlled gap between adjacent chambers to permit the gating therebetween of particles of desired size, while guiding the substance along the deflected portion of the top surface of the plate from one chamber to another and while preventing flushing from the chambers.

In micro-scale applications, the mechanism to control the particle or molecule size exclusion is a beam or plate effectively anchored at the bottom of each of the substance-processing chambers, where the top of the beam or plate and the bottom of the chamber are polished to a degree finer than the size of particles to be excluded, and the two polished surfaces are brought into intimate contact. An extension to the anchoring point of the beam or plate acts as the force source to the beam or plate, such that when the extension is deflected a known relatively large amount, the resulting deflection in the neighborhood of the anchoring point is relatively very small such that the extension creates a transmission effect. Bending the extension down, makes the beam act like a cantilever and opens the system for flushing. Bending the beam up, puts the beam in three point bending and guides the substances from one chamber to another. This allows for lower cost actuation than would be possible if the force were applied locally, although the layout of chambers and polished beams or plates could also be actuated locally if fine enough force control is obtainable. This fundamental new mechanism, Ultra Surface Finish Effect Mechanisms (USFEMs), may prove to provide controlled gating for the field of instruments for biology and chemistry applications, as useful as the transistor in the field of computers.

Preferred and best mode embodiments are hereinafter described.

DRAWINGS

The invention will now be described with reference to the accompanying drawing in which:

FIG. 1A shows a cutaway side view of an USFEM of the invention with the beam or plate operated to bend or deflect downwardly for a flushing mode;

FIG. 2A is a cutaway side view of the beam operated to bend upwardly for a transfer mode of substances from one chamber to another;

FIG. 2C is an enlarged partial cross section, similar to FIG. 2B, that shows the beam or plate in its neutral unbent or undeflected mode;

FIG. 3 is an isometric view of the USFEM, of the invention in preferred form, showing chamber shapes that help to optimize the bending topology created in the beam or plate;

FIG. 4 is a longitudinal cutaway side view of FIG. 3;

FIGS. 5A–5D show layer by layer the construction of the USFEM of FIG. 3;

PREFERRED EMBODIMENT(S) OF THE INVENTION

Figure 1B:
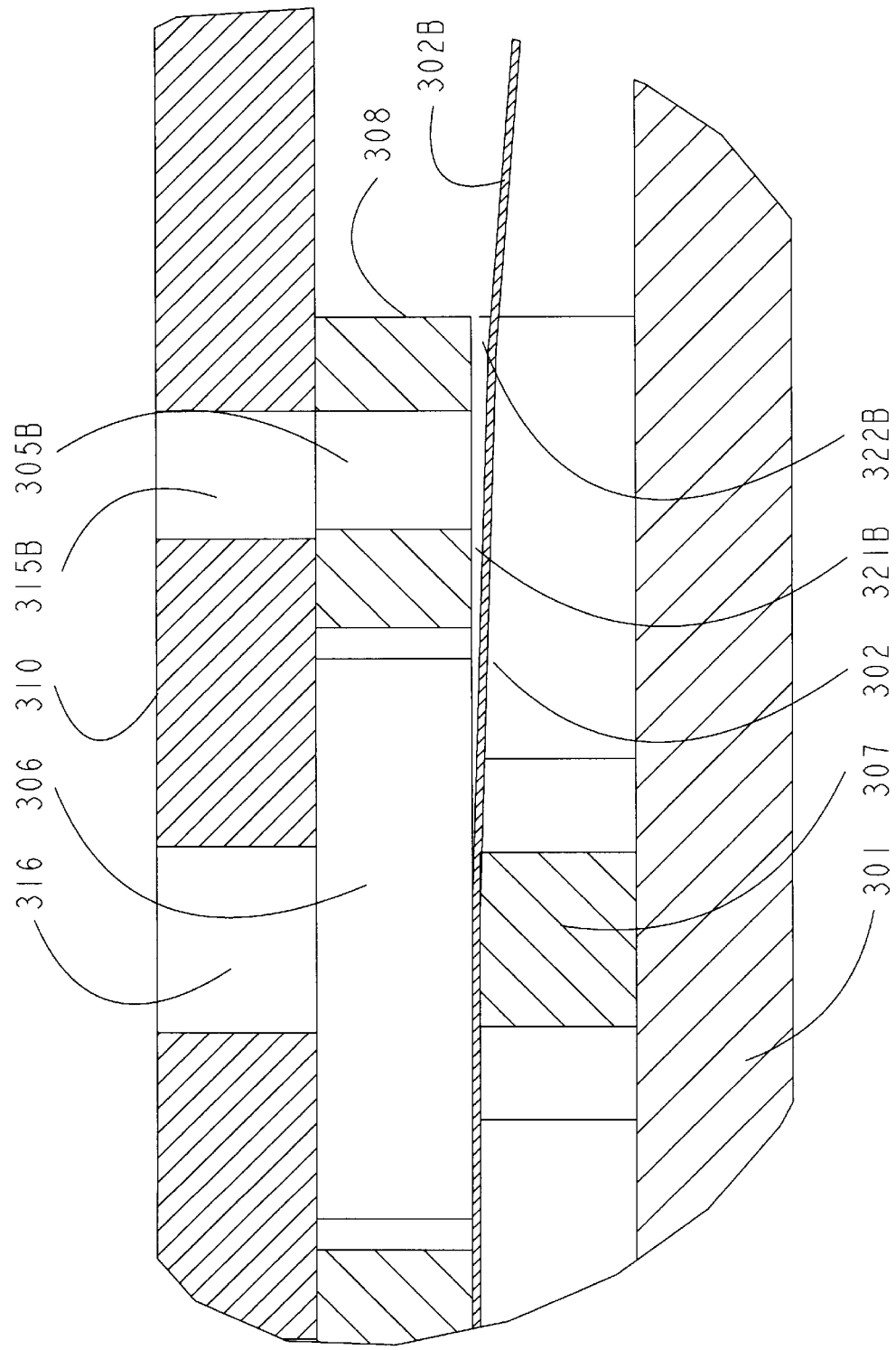
FIG. 1B is an enlarged partial cross section, of FIG. 1A, more clearly showing the gap produced by the beam or plate as it bends down.

In FIG. 1A, an Ultra Surface Finish Effect Mechanisms (USFEMs) of the invention is shown at 100, comprising a baseplate 301, and an H-shaped spacer plate 307 upon which rests a polished gate-plate or planar beam 302 with left and right beam extensions 302A and 302B. The extension 302B (to the right) is pulled downwardly by an electrostatic or electromagnetic actuator 303B, powered by electrical conductors 333B and 334B connected to a controllable power source such as is standard in the field of electronic control of mechanical systems. The plate or beam 302 when undeflected normally closes off the bottom adjacent hollow chambers 305A and 305B (on either end of a supply chamber or well 306) used to receive samples for processing and filtering or separation or the like. Gaps 321B and 322B open upon downward deflection, but of much smaller displacement of 302B than at the actuator 303B, due to the transmission effect of a bending beam. FIG. 1B shows a magnified view of this small gap opening at the bottom of chamber 305B. When manufactured on a micro scale, for example as a silicon micro electro- mechanical system, the electrical elements and the mechanical elements would all be monolithically built into the different plates.

Top manifold plate 310 allows fluid to be drawn out from chambers 305A or 305B in chamber-plate 308, by access holes 315A or 315B, respectively. The central supply well (or chamber) 306 is supplied by hole 316. In the state as shown, the gap 321B that has opened allows fluid to pass from the central supply well (chamber) 306 to the region of well (chamber) 305B, but there is also a gap 322B that allows the fluid to be flushed out. This may be used to void small-unwanted particles or fluids from the system. To achieve the same effect on the left side of the beam, actuator 303A would pull down beam extension 302A. The scale of this device can be from inches to micrometers. That is one of the beauties of the mechanism: the mechanics operate at any level; it is the surface finish of the contact surfaces between the top of gate-plate 302 and the underside of the chambers at the bottom of surface plate 308 that governs the accuracy of the USFEM opening and the resealing thereof on closure. The amount of transmission effect that is obtained from the bending members will be discussed later, as well as the fluid flow characteristics.

It should be noted that the fundamental operating mode of bending creates a peeling effect. This is very important, because the essentially atomically smooth surfaces may otherwise have a tendency to stick. The peeling mode that occurs as the beams or plates deflect will help to prevent sticking.

It should also be noted that while the actuator 303B could be operated in a on-off mode, the voltage applied across conductors 333B and 334B could easily be regulated to create a variable displacement of the end of the beam 302B and hence a controllable variable displacement of gaps 321B and 322B. Since small variations in the thickness of the beam 302B would cause large differences in the stiffness of the beam, the system could initially be calibrated by applying a DC voltage to the terminals 333B and 334B to power the actuator, while using the same actuator as a capacitance measuring device that is operated using AC carrier voltages. In this manner, the DC voltage required to cause the beam 302B to bend until it touches actuator 303B can be determined. Then, a scaled voltage to the actuator 303B would produce a proportionally scaled displacement of the beam 302B, resulting in a scaled controllable displacement of the gap 321B.

Figure 2B:
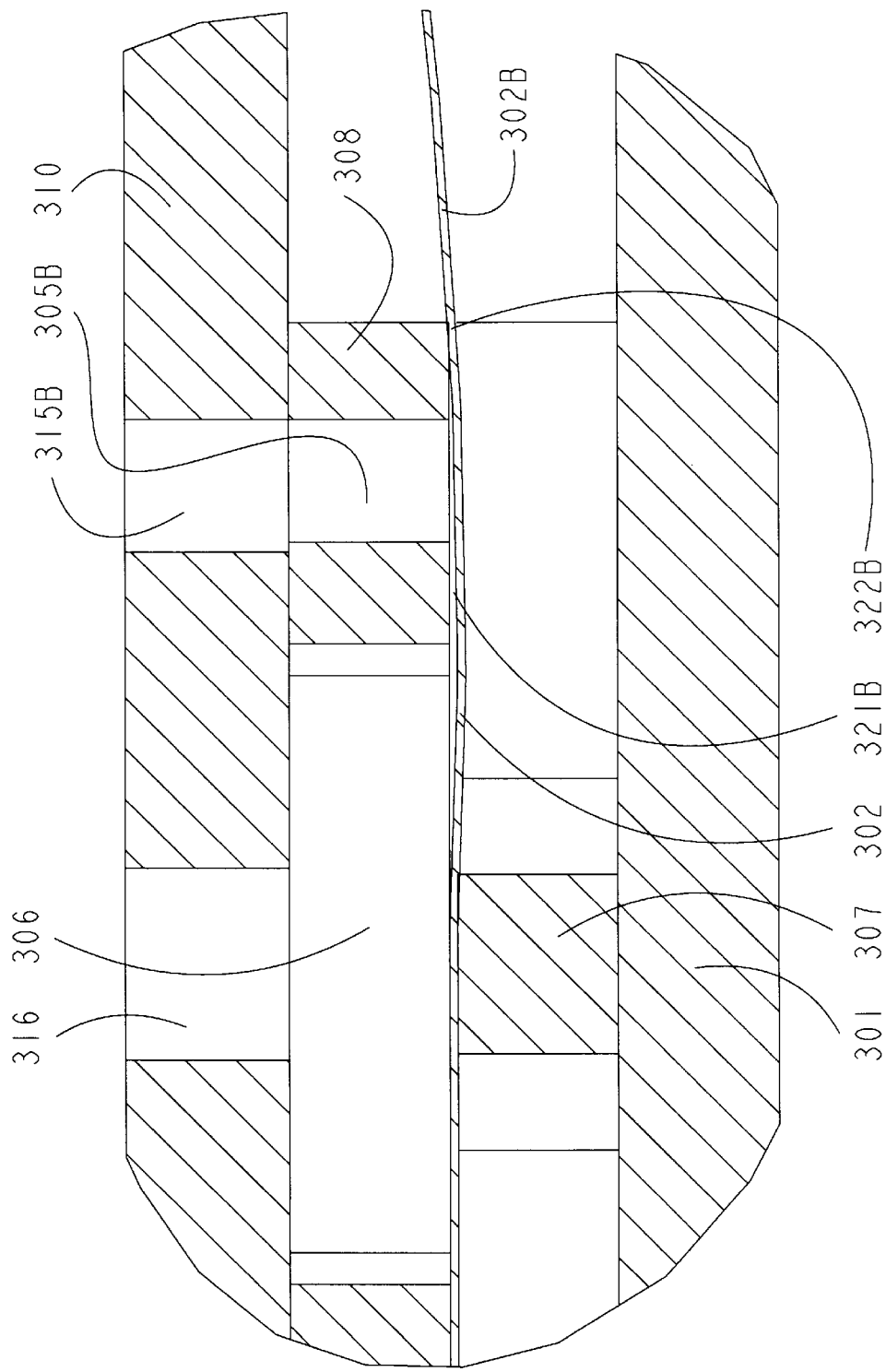
FIG. 2B is an enlarged partial cross section of FIG. 2A, more clearly showing the gap produced by the beam or plate as it bends upwardly.

FIG. 2A shows the device 100 where the beam extension 302B is bent up by actuator 313B. FIG. 2B shows a magnified view of the gaps that are created, and FIG. 2C shows the system with all the actuation forces turned off. The actuator 313B is powered by electrical conductors 323B and 324B in a manner like the actuator 303B described above. In this case, there is an effective seal at 322B, where the reaction force between the bottom of plate 308 and the top of beam extension 302B is high. There is a small well-defined gap 321B, again defined by the transmission effect of a bending beam. In this mode, substances are transferred from the supply well 306 to the analysis well 305B. It should be noted here that this patent deals with fundamental mechanisms for sizing. It does not address the sensors and fluid handling systems.

The present invention, moreover, involves the use of an important fundamental physical principle: Applying a precise force to a precisely dimensioned beam can result in a precisely controlled deflection. Given that beam stiffness is a function of the cube of the beam thickness, however, control of deflection to the nanometer level would normally be difficult. If a distance measuring device, such as a capacitance probe, is electrically incorporated into the actuators 303 and 313 as described above, a position servo may be formed using servo control methods known to those skilled in the art of servo mechanical systems, readily enabling the gate-plates beam extension deflection of the invention to be controlled.

An effective mechanism is thus provided to control the size of particles flowing through it, even to the nanometer scale, that contains the beam or plate 302 effectively anchored at the bottom of each of the substance processing chambers 305A, B and 306, and where the top of the beam or plate and the bottom of the chambers are polished to a degree finer than the particle size to be excluded, and with the two polished surfaces normally brought into intimate contact. The extension 302B (A) to the beam or plate 302 acts as the force source to the beam or plate, such that when the extension is deflected a known large amount, FIGS. 1A, 1B, 2A, 2B, the resulting deflection in the neighborhood of the anchoring point is very small, thus enabling the extension(s) to create a transmission effect. Bending the extension down, FIGS. 1A and 1B, makes the beam act like a cantilever and opens the system for flushing. Bending the beam up, FIGS. 2A and 2B, puts the beam in three point bending and guides the substances from one chamber to another, with appropriate exit seal.

While the design shown herein is for a single stage mechanism, such lends itself also to stacking. For example, the actuators 303 and 313 can themselves reside on actuated beams, thereby creating a two-stage opening capability for the beam extensions 302A and 303B. This creates a two-state machine, a compromise between the on-off simple machine, and a servo controlled machine. In any case, however, the invention embodies the principle of using a bending beam or plate as a transmission element, and the peeling-apart effect of two ultra surface finished plates to create a precisely controllable opening slit gap gate. The amount of transmission effect required depends on the force the actuator can generate, and in the case of a servo controlled force, the accuracy of the displacement sensor.

In some designs, a beam extension may not even be needed, and the servo-controlled actuator may be located directly under the chamber 305B. In this case, to prevent leakage, the chamber-plate 308 would have to be much longer, along the length of the top manifold plate 310. However, without the beam extension, the bend-up mode and bend-down mode for control of substance flow for flushing or direction would not both be achievable, unless multiple actuators were used. In the case of such multiple actuators under the gate-plate, a moving volume, almost like a peristaltic action, can be achieved to ferry the volume between chambers. Again, the fundamental principle of the use of two polished facing surfaces is at work in this design.

It should also be observed that electric fields are sometimes used to affect the position of chemicals; so the ability to actuate the USFEM using a relatively remotely located electromagnetic actuator is a very important feature. The beam may, if desired, also be actuated by fluid or pressure.

FIGS. 3 and 4 show a USFEM of the invention with the top manifold plate and top actuator set removed. Left and right hand beam actuators 302A and 302B show that a narrowing of the beam or plate, with respect to the full width of the gate-plate 302 under the chamber-plate 308, helps to increase the transmission effect without greatly lengthening the beams. The baseplate 301 has on its surface the actuators 303A and 303B that are used to actuate the beam arms 302A and 302B. H-shaped plate 307, which can be seen better in FIG. 5C, supports the outer edges of the plate, so they can be clamped between the bottom of plate 308 and the top of the H-plate 307. The cutout portion of the H provides regions where the polished plate 302 can deflect between the wells or chambers 306 and side chambers 305A and 305B when bending moments are introduced to the plate or beam by the plate extensions 302A and 302B. In operation, the center well 306, may hold the initial form of the substances to be processed. With the wells 305A and 305B formed into "C-Shape", such may serve as secondary processing chambers or wells into which substances are to be sorted, as earlier described in the operation of the system in FIGS. 1A, B and 2A, B. The chambers 305 are preferably C-shaped to better collect fluid and help prevent such from gathering in thin spaces between plate 302 and plate 308. Ancillary external wells 304A, 304B, 304C, and 304D, FIGS. 3 and 5B, can be used as seals by providing them with pressurized gas, but they may not be required depending on the substances being processed.

FIGS. 5A through 5D show the USFEM device 100, layer by layer. In FIG. 5A, the view includes the baseplate 301, H-plate 307, gate-plate 302 with its beam extensions 302A and 302B, well plate 308, and top manifold plate 310. The access ports for the manifold plate can also be seen. Ports 317A, 317B, 317C, and 317D are where gas can be supplied to the seal wells 304A, 304B, 304C, and 304D shown in FIG. 3 and 5B. Port 316 is used to initially supply the well 306. Ports 315A and 315B provide access to wells 305A and 305B respectively. Any of these access ports may be for substance flow, or for measurement devices to peer into a well below.

FIG. 5B shows the USFEM device 100 with the top manifold plate 310 removed. Chamber-plate 308 that contains the wells for processing of the substances is clearly visible, as in FIG. 3. FIG. 5C illustrates the device with the chamber-plate 308 removed, showing clearly the gate-plate 302. FIG. 5D shows only the base plate 301 and the H-plate 307. Actuators 303A and 303B are visible in all FIGS. 5A–5D views.

The preferred manufacture of the USFEM of the invention would provide a polished base-plate 301 with the actuators 303A and 303B created on it. The H-shaped plate 307 may also formed on it, as well. This state is shown in FIG. 5D. The manufacturing methods for this stage are well known to those skilled in the art of silicon micromachining (fabrication of MEMs devices). Several methods of forming the rest of the structure may be used. For example, the state reached in FIG. 5C may be achieved either by growing and/or undercutting the beam 302, or by fusing a separately formed beam 302 to the top of the H-plate 307. Regardless of how it is formed, however, the top surface of the gate-plate 302 and the bottom of the chamber-plate 308 must be polished to achieve surface finish and flatness to a level greater than the size of the substance or particles to be sorted. For example, if a 10-nanometer particle is to be regulated, the surface finish should be on the order of 5 nanometers. The next step is to add the chamber-plate 308, and it can only be attached to the gate-plate 302 in the regions of the H-plate 307. This is perhaps best accomplished with a well-known clamping system, (not shown) and in sheet metal form with bolts that pass through all the plates, and located at the tips of the H-plate. Alignment of the chamber-plate 308 and the gate-plate, and fusing or clamping in selected regions is known to those skilled in the art of MEMs fabrication.

UNDERLYING GATE-PLATE TRANSMISSION PRINCIPLES OF THE INVENTION

In order to further illustrate the novel principle of the gate-plate transmission effect, underlying the invention, and to provide insight into serviceable relative proportions for a plate-type system, which would require finite element analysis to optimize, simple beam models are most useful. First consider a simple cantilever beam with moment of inertia, I, and elastic modulus, E. The deflection of any point along the beam is given by:

$$\delta(x) = \frac{F}{EI}\left(\frac{x^3}{6} - \frac{L^2 x}{2} + \frac{L^3}{3}\right)$$

The goal is to find the distance along the beam where the deflection will be the desired small amount, when the end of the beam is deflected a reasonable controllable amount. If the distance is x, and the beam length is L, then writing $\beta = x/L$:

$$\delta(x) = \frac{FL^3}{6EI}(\beta^3 - 3\beta + 2)$$

For the case where the beam is bent up, (FIGS. 2A and 2B), to allow the materials to flow from the source well 306 to the analysis well 305b, for example, the beam is modeled as simply supported at two points, and a force applied at a third cantilevered point. In this case, where the distance from the force to the first support point is $L_1$ and the distance from the force to the second support is $L_2$, the deflection $\delta$ as a function of distance x from the point of force application is:

$$\delta(x) = \frac{F}{6EI}\left(x^3 + \frac{(L_1^3 - L_2^3)}{L_2 - L_1} - L_1\left(\frac{L_1^3 - L_2^3}{L_2 - L_1} + L_1^2\right)\right)$$

These equations can be used to show theoretically in a simple 2D design, that it is rather straightforward to design a silicon beam to accomplish the goal of achieving one nanometer deflection of the beam at a position 25 microns along a beam, where the tip of the 500 micron long beam is deflected 2 microns.

Actual implementation of the design, however, requires a 3D design, to keep the fluid from leaking out the sides of the system. The effect to be achieved is a dimpling of the plate. The equations above, however, are most instructional in helping the designer consider how the beams will bend. This guides the design for the 3D case, where the actual deflections must then be checked using finite element analysis.

Figure 6:
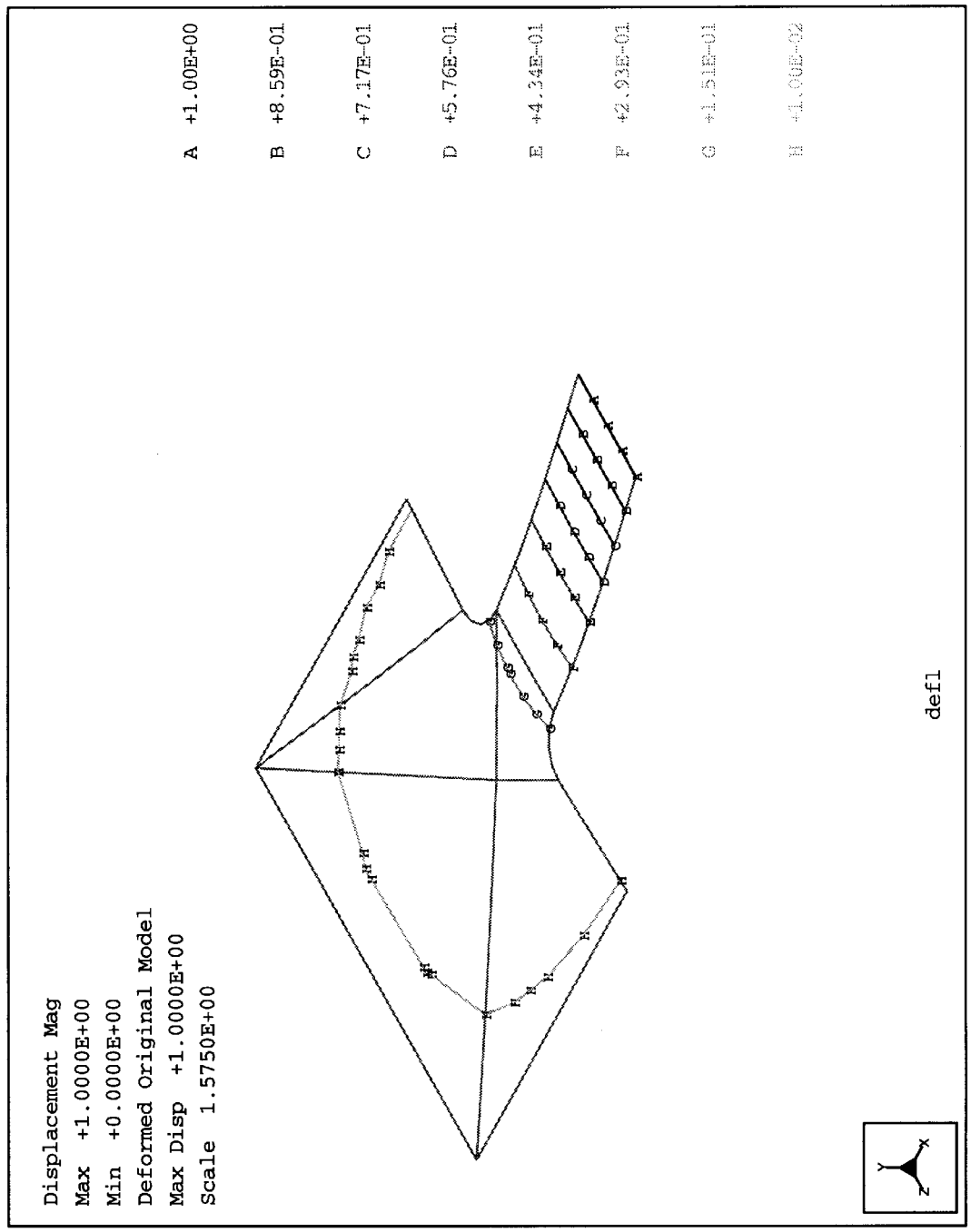
FIG. 6 is a finite element deflection diagram of a USFEM beam or plate that is simply supported at two opposite edges.
Figure 7:
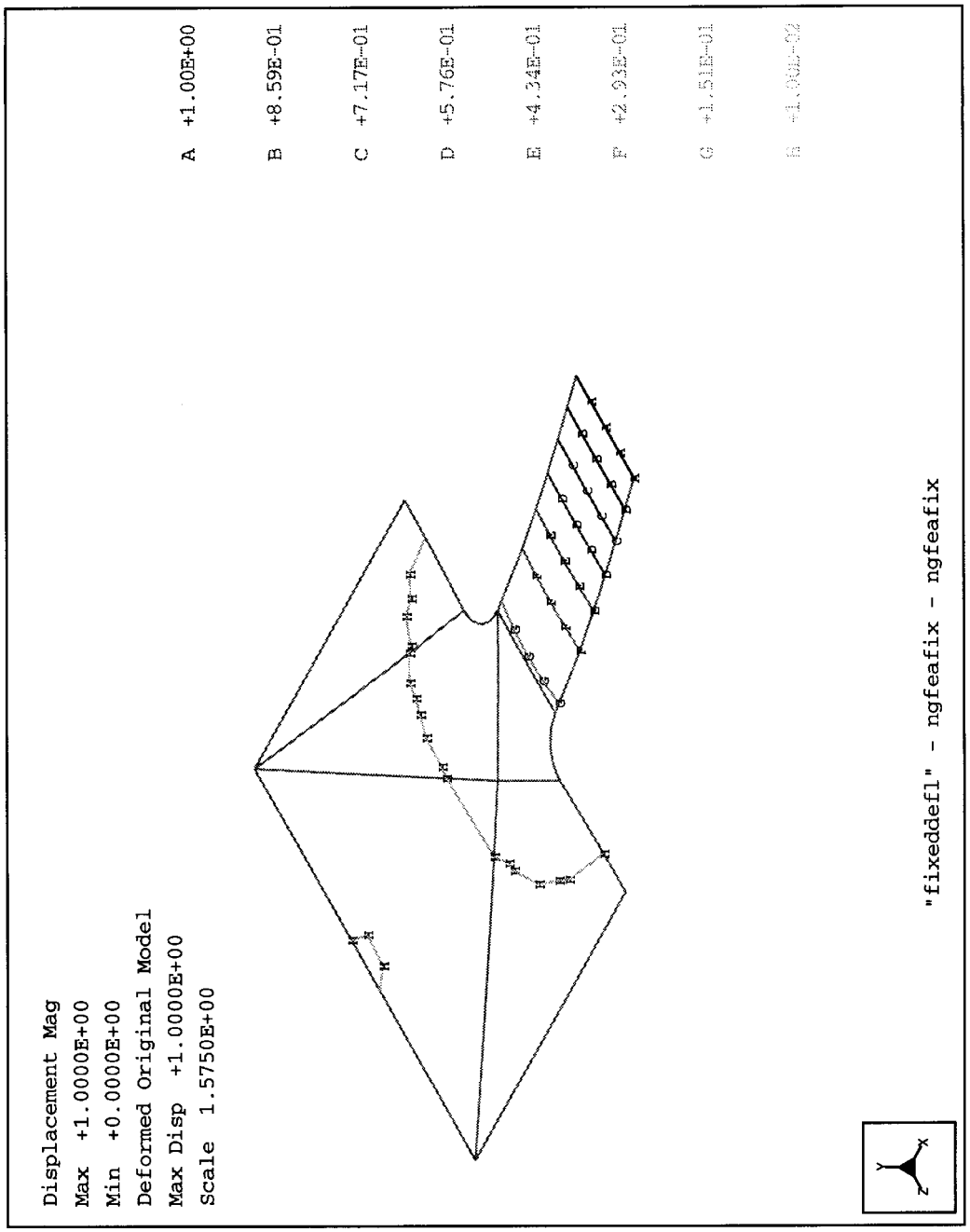
FIG. 7 is similar to FIG. 6 but is a finite element deflection diagram of a USFEM beam or plate that has fixed supports at two opposite edges.

FIG. 6 shows finite element analysis results for a gate-plate with a scale on the order of 100 microns, where the deflection along the contour line labeled "A" is one micron, and the deflection along the contour labeled "H" is 10 nanometers. If the extension beam length were doubled, since the deflection goes as the cube of beam length, the deflection of the contour labeled H would be reduced by an order of magnitude. It should be noted in the plate of FIG. 6, the outer two edges, which are parallel to the beam extension, are assumed to be simply supported; that is, they only restrain the beam in a vertical direction. Comparing this to the finite element model shown in FIG. 7 where the same edges are now assumed fully restrained in displacement and rotation, the deflection contour values are the same, even though their distribution is different; the restrained edge plate is stiffer, and thus achieves a higher transmission effect. The fixed-edge plate would also be easier to build.

MACRO AND MICRO EXEMPLARY SIZING

When reduced to practice on a macro scale, as for use for sorting larger objects such as powders or particles in solutions, a prototype model had a beam length 302B of about 10 inches. It was made from 0.08-inch thick polished stainless steel sheet, and it took about 5 pounds to deflect the end of the beam up about 1-inch. The resulting gap 321 was about 0.005 inches. Structural systems scale very nicely, so what works on a macro scale, when scaled to the micro level, usually works even better because there are fewer defects on the microscale.

For micro-usage, the design is shrunk by a factor of 10,000, providing a beam 302B that is 0.001 inches long;, and when it is deflected 0.0001 inches (2.5 microns) the gap 321B is about 10 nanometers, serviceable for biological and molecular uses. The voltage on the actuators 303 and 313 can be reasonably controlled to one part in ten, so gap 321B may readily be set from one to 10 nanometers.

FLUID FLOW RATE CONSIDERATIONS

Now to consider the fluid flow rate through the gaps. As the beams bend, the gap will vary across the land, although slightly. As an aid to help determine how long to make the gap, the flow resistance R, pressure differential over flow for a fully developed viscous flow in a wedge shaped region is known by those skilled in the art of fluid flow mechanics to be:

$$R = \frac{\Delta P}{Q} = \frac{6\mu}{h_1^2 L \sin\beta}\left[\frac{1}{\left(1 - \frac{L}{h_1}\cos\beta\sin\beta\right)^2} - 1\right]$$

where $h_1$ is the gap at the thick end of the wedge, the opening to the gap 321B in FIG. 1, and for unit depth. Typical solvents and viscosities used have viscosities on the order of water, 0.001 N-sec$^2$/m @20° C. For illustrative purposes, consider the following example:

| | | |
|---|---|---|
| Height, h_1 (m) | 1.00E-09 | |
| Viscosity, mu (N-sec^2/m) | 0.001 | |
| Length, L (m) | 5.00E-05 | |
| width, w (m) | 1.00E-04 | |
| h_2 | 3.00E-09 | |
| Angle across land, Beta (rad) | 4.00E-05 | |
| Resistance | 1.28E + 16 | |
| Applied pressure, P (N/m^2, atm) | 202860 | 2 |

-continued

| Flow, microliters/sec, m^3/sec | 0.0158484 | 1.58E-11 |
| Depth of reservoir, d (m) | 1.00E-03 | |
| Width of chamber, wc (m) | 1.00E-04 | |
| Volume of chamber (microliters, m^3) | 0.005 | 5E-12 |
| Time to empty chamber, (sec) | 0.32 | |

To visualize fluid flow through the USFEM of the invention, consider the micro problem of sorting through a collection of molecules. The collection of molecules may be analogized for present purposes to a bag of marbles of different sizes. The USFEM device of the invention is used to gate open a slit or gap of a first small size to let the smallest marbles first roll through and then be identified. Different openings are then used to let successive sizes of molecules through. For biological applications, as an illustration, assume that molecules are introduced, as with a micro syringe through port 316 into chamber 306. The molecules are left to react, and then it is desired to see which molecules did not react. When the beam 302B is bent up, (FIGS. 2A and 2B) for example, halfway by applying half-maximum voltage to electrostatic actuator plate 313B, the very smallest molecules can slip through the slip opening or gap 321B into chamber 305B. The molecules cannot pass beyond the port, because the beam makes a tight contact seal at 322B. Then the actuation force on the beam or plate is released, and the beam then lies flat as shown in FIG. 2C. The molecules may now be identified using a probe, such as laser fluorescence, introduced through port 315B, or the molecules may be drawn off through port 315B using a micro syringe.

To clean the system, the beam 302B is then bent downwardly as shown in FIG. 1A by applying voltage to electrostatic actuator 303B. Solvent cleaner can be flushed through the system to remove a particular molecular species from ports 315B and if needed through port 316, cleaning gaps 321B, 322B and the port 315B and chamber 305B.

The left side of the system may have a different stroke limit set on it, so the actuator 303A or 313A would cause a different deflection of beam 302A than beam 302B, and thus cause a different opening and thus sort a different size molecule.

Figure 8:
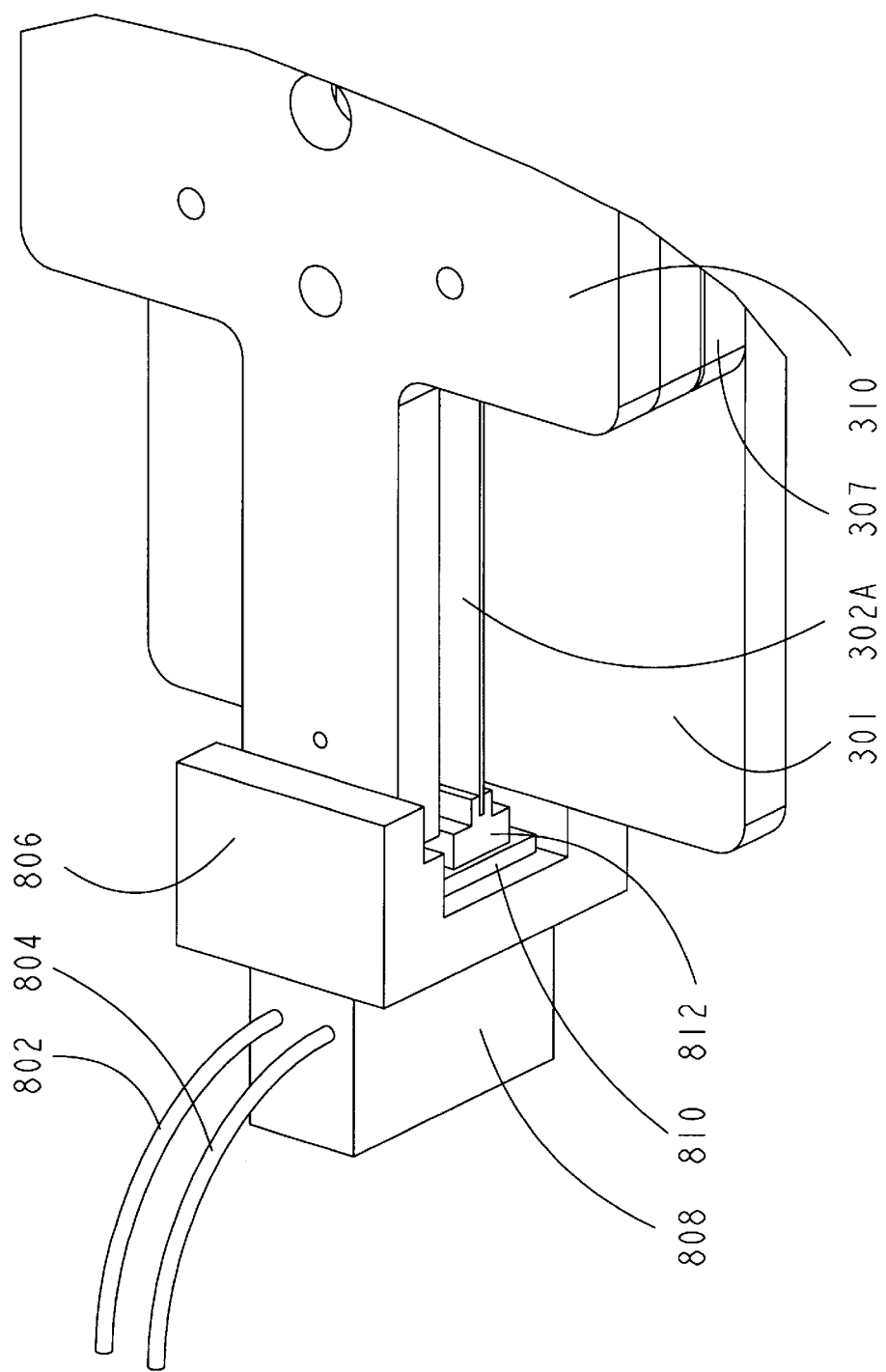
FIG. 8 is a cross sectional view of a USFEM system of the invention wherein the plate deflection is even more precisely controlled using a voice-coil type actuator as a position servo to control the tip deflection over a very wide position range.

Returning to the concept of proportional actuation of the gate-plate, FIG. 8 shows an enlarged partial isometric of one half of the system. Here, the beam 302A has on its left-hand end a conductive plate 812 that is offset from a coil 810 which is mounted to frame 806 in turn mounted to plates 301 and 310. Input control wires 802 and 804 provide control signals to the electronic control module 808. The system functions in the manner, for example, an electromagnetic voice coil actuator, where displacement of the beam, acting like a spring, is proportional to the force applied. There are many ways that actual displacement may be sensed, as is well known to those skilled in the art of servo controlled mechanical systems, or the system may be run open loop as described above.

As a further illustration of the usefulness and diversity of the USFEM device and technique of the invention, such shows promise for micro scale analytical instruments, including nano-mass diffusion separation, nano-chemical diffusion separation, nano-chemical affinity separation, fixed non-filtration, controllable nano-filtration etc. For example, mass spectroscopy macroscopic mass spectrographs use a bending field, such as magnetic or electric or gravitational, to bend a moving beam of mixed particles. Lighter masses are more easily deflected. At the MEMs level, USFEMs can be used to sort the molecules into bins, using a cascaded series of USFEMs, and then the molecules can be counted, using atomic force probes, like a molecular multi-channel analyzer which identifies specific molecules, or ratios etc.

Another use of the invention is to build chip scale DNA sequencing machines such as of MEMs components, USFEM gating valves of the invention usefully controlling of reactants, molecule by molecule. Then, instead of processing and purifying the resultant by batch processing through electrophoresis to select the target molecular weight in a little stripe of gel, a semi-permeable porous silicon permanent gel with an array of USFEM gate valves would pull the desired resultant molecules out of the reactant in a semi-continuous method. This, in effect, provides a tiny continuous line chemical factory on a chip. Using semi peristaltic molecular pumps, the feed stocks and reactants can be moved from stage to stage. The invention thus provides promise for building entire DNA sequencing machines on chips.

Staircase USFEMs filters can be used like a fish ladder to purify chemicals and filter for specific molecular weights or size ranges, all greater than a size, less than a specific size, or only between two sizes. Ultra pure polymeric weight materials may now be generated this way with numerous other applications in medicine, lubrication, plastics, and basically any system that uses organic chemicals.

There are also other types of flexural elements that exhibit transmission effects, such as bowed beams depressed in the middle that cause their ends to slightly extend, and the use of such cascaded elements to allow a large displacement at one point to create a small displacement of one ultra finished surface from another to allow for controlled gating effect is within the scope of this invention.

The USFEM gating and controlling mechanism of the invention has the potential to be to the chemical and biological communities somewhat of a tool that the transistor has been to the electronics community. It is therefore anticipated that further modifications of the invention will also readily occur to persons skilled in the art, and all such are deemed to fall within the spirit and scope of the invention as defined by the appended claims.

What is claimed is:

1. A method of mechanically gating the flow of particle-containing fluid substances and the like contained in a pair of adjacent hollow chambers, that comprises, polishing the top surface of a resilient plate that is to extend over and close off the bottom edges of the hollow chambers and also correspondingly polishing the chamber bottom edges to a degree further that the size of the particles to be excluded during the fluid substance gating from the chambers; anchoring the plate to extend over and normally close off the bottoms of the chambers during contact with the top surface of the plate; extending the plate at least from one end to provide a deflection force surface therefor, applying selectively downwardly and upwardly directed deflection actuating forces to the plate extension surface to deflect the extension an amount large compared to the resulting deflection of the plate in the neighborhood of its anchorage, thereby to create a transmission effect along the plate; the plate, when deflected, downwardly, bending down like a cantilevered beam to open a controlled gap between a bottom edge of a chamber and the top surface of the plate to permit the gated flushing of particles of desired size range in the fluid substance out of that chamber; and the plate, when deflected upwardly, bending up to establish multiple point contacts that provide a controlled gap between adjacent chambers to permit the gating therebetween of particles of desired size, while guiding the substance along the deflected portion of the top surface of the plate from one chamber to another and while preventing flushing from the chambers.

2. The method as claimed in claim 1, wherein plate deflection extensions are provided from both ends of the plate and deflection actuation is selectively effected at both ends to permit gated flushing and inter-chamber gated flow in opposite directions along the plate as desired.

3. The method as claimed in claim 1, wherein at least two adjacent chambers are provided and the downward deflecting permits gated flushing from the chambers while the upward deflecting permits gating of fluid between the chambers guided along the portion of the top surface deflected from adjacent chamber edges.

4. The method as claimed in claim 3, wherein the multiple points of contact of the deflected plate are three in number: one at the end of the upwardly deflecting extension; a second at the bottom edge of the one chamber that is closer to said extension thereby to prevent flushing; and a third, at a bottom edge of the other chamber displaced from said one chamber.

5. The method as claimed in claim 3 wherein particles are in the nanometer range as for flushing biological and chemical substances.

6. The method as claimed in claim 3 wherein the plate deflection actuation is on-off.

7. The method claimed in claim 3 wherein the plate deflection actuating is effected with position feedback to allow beam extensions deflections to be precisely controlled.

8. A mechanical flow gate for controlling the size of particles flowing through the gate, having, in combination, a resilient beam plate anchored to extend over and normally close off the bottom of a plurality of adjacent hollow chambers adapted to receive fluid substances containing the particles, wherein the top of the plate and the bottom edges of the chambers are polished to a degree finer that the particle(s) size(s) to be excluded in the gating; an extension to at least one end of the plate serving as a deflection force surface therefor; actuator means for selectively applying downwardly and upwardly directed deflection to the plate extension surface to deflect the extension an amount large compared to the resulting deflection of the plate in the neighborhood of the anchorage; thereby to create a transmission effect along the plate; said plate when deflected downwardly bending down like a cantilevered beam to open a first controlled gap between a bottom edge of a chamber and the top surface of the plate to permit the gated flushing of particles of desired size range in the fluid substance out of that chamber; and the plate, when deflected upwardly, bending up to establish multiple point contacts that provide a second controlled gap between adjacent chamber bottoms to permit gating therebetween of particles of desired size while guiding the fluid substance along the deflected portion of the top surface of the plate from one chamber to another, and while preventing flushing from the chamber.

9. The flow gate as claimed in claim 8, wherein a plate deflection extension is provided from both ends of the plate.

10. The flow gate as claimed in claim 9, wherein actuator means are provided cooperative with each end of each extension to permit gated flushing and inter-chamber gated flow in opposite directions along the plate as desired.

11. The flow gate as claimed in claim 8, wherein at least two adjacent chambers are provided and the downward deflecting permits gated flushing from the chambers through the first gap, while upward deflecting permits gating of fluid between the chambers guided along the portion of the top surface deflected from adjacent chamber bottom edges and forming said second gap.

12. The flow gate as claimed in claim 11, wherein said multiple point contacts are three in number; one at the end of the upwardly deflecting extension; a second at the bottom edge of the one chamber that is closer to said extension, thereby to prevent flushing; and a third, at a bottom edge of the other chamber displaced from said one chamber.

13. The flow gate as claimed in claim 11, wherein the plate deflection actuation is on-off.

14. The flow gate as claimed in claim 11, wherein the plate deflection actuation is effected with position feedback to allow the plate extension deflections to be precisely controlled.

15. The flow gate as claimed in claim 8, wherein a pair of outer chambers is provided on either side of a center well.

16. The flow gate as claimed in claim 15, wherein the outer chambers are of substantially C-shaped contours, oppositely positioned to include the well chamber therebetween.

17. The flow gate as claimed in claim 15, wherein further wells are provided external of and ancillary to the pair of chambers to provide seals as with pressurizing gas.

18. The flow gate as claimed in claim 15, wherein the chambers are formed in an upper manifold plate anchored to the top surface of the beam plate.

19. The flow gate as claimed in claim 18, wherein a base plate carrying an H-shaped stiffening plate is anchored to the bottom surface of the beam plate.

20. The flow gate as claimed in claim 8, wherein the particles are in the nanometer range such as occur in biological and chemical applications.

21. The flow gate as claimed in claim 20, wherein the beam plate is of the order of 0.001 inches long, deflectable through deflections of the order of 0.0001 inches (2.5 microns) to produce gaps of the order of 10 nanometers, serviceable for biological and molecular uses.

22. The flow gate as claimed in claim 21, wherein the polishing is ultrafine of the order of 5 nanometers of surface finish, suitable for filtering particles of the order of 10 nanometers.

23. The flow gate as claimed in claim 10, wherein the actuators are integrally formed on a base plate anchored to the bottom surface of the beam plate.

24. The flow gate as claimed in claim 21, wherein the mechanical and actuator elements are monolithically formed as a silicon micro electromechanical system.

25. The flow gate as claimed in claim 22, wherein the ultrafine polished beam plate, in bending, creates a peeling effect from the ultrafine polished chamber bottom edges, preventing sticking.

26. A substance flow gate for controlling the flow of a substance from a substance containing hollow-chamber, having, in combination, a polished resilient plate normally anchored to extend over similarly polished bottom edges of the chamber to close off the bottom of the chamber; and means for deflecting the plate to produce a gap between the plate and the bottom edges for permitting controlled flow of the substance from the chamber, wherein a second adjacent hollow chamber is provided also closed off by the plate, with downward deflection of the plate creating a gap so as to enable gated flushing of the substance from the chambers, while upward deflection creates a gap so as to enable gated flow between the chambers.

27. The flow gate of claim 8 wherein the extension is narrower than the plate.

28. The flow gate of claim 9 wherein the extensions are narrower than the plate.

* * * * *